United States Patent
Zhang et al.

(10) Patent No.: US 9,900,905 B2
(45) Date of Patent: Feb. 20, 2018

(54) DATA TRANSMISSION METHOD AND SYSTEM

(71) Applicant: Sanechips Technology Co, Ltd., Shenzhen, Guangdong Province (CN)

(72) Inventors: Yongsheng Zhang, Shenzhen (CN); Wenqiong Lin, Shenzhen (CN)

(73) Assignee: Sanechips Technology Co., Ltd. (CN)

( * ) Notice: Subject to any disclaimer, the term of this patent is extended or adjusted under 35 U.S.C. 154(b) by 47 days.

(21) Appl. No.: 15/028,587

(22) PCT Filed: May 22, 2014

(86) PCT No.: PCT/CN2014/078177
§ 371 (c)(1),
(2) Date: May 9, 2016

(87) PCT Pub. No.: WO2014/180386
PCT Pub. Date: Nov. 13, 2014

(65) Prior Publication Data
US 2016/0249379 A1    Aug. 25, 2016

(30) Foreign Application Priority Data

Oct. 11, 2013   (CN) .......................... 2013 1 0474399

(51) Int. Cl.
*H04J 3/06*          (2006.01)
*H04W 72/12*         (2009.01)
(Continued)

(52) U.S. Cl.
CPC ...... *H04W 72/1273* (2013.01); *H04B 1/0003* (2013.01); *H04W 56/00* (2013.01)

(58) Field of Classification Search
None
See application file for complete search history.

(56) References Cited

U.S. PATENT DOCUMENTS 8,458,389 B2   6/2013   Kwon et al.
9,019,997 B1 *  4/2015   Mok ..................... H04B 10/07
                                               370/503
(Continued)

FOREIGN PATENT DOCUMENTS

CN     102103564 A    6/2011
CN     102638885 A    8/2012
(Continued)

OTHER PUBLICATIONS

European Search Report dated Sep. 29, 2015 for European Patent Application No. 14794098.5.
(Continued)

*Primary Examiner* — Kwang B Yao
*Assistant Examiner* — Juvena Loo
(74) *Attorney, Agent, or Firm* — Plumsea Law Group, LLC

(57) ABSTRACT

A data transmission method and system, related to the field of communication, resolve the problem of data transmission in a software defined radio (SDR) system. The method includes: a data path mapping data received from an RFC to a preset unified time reference, then collecting data and caching the data obtained from collection; after the data path caches the data obtained from the collection, an event table generating a downlink data processing event, and scheduling a vector processor to perform downlink data processing. The technical solution provided in the embodiments of the present document is applied to the SDR and achieves the data transmission at high utilization rate.

14 Claims, 5 Drawing Sheets

(51) Int. Cl.
*H04B 1/00* (2006.01)
*H04W 56/00* (2009.01)

(56) References Cited

U.S. PATENT DOCUMENTS

| | | | | |
|---|---|---|---|---|
| 2005/0275674 | A1* | 12/2005 | Hung | G06F 13/4291 |
| | | | | 347/14 |
| 2005/0286521 | A1* | 12/2005 | Chiang | H04J 3/1652 |
| | | | | 370/389 |
| 2007/0097902 | A1* | 5/2007 | Aweya | H04B 7/2643 |
| | | | | 370/321 |
| 2012/0155476 | A1* | 6/2012 | Pavani | H04J 3/0658 |
| | | | | 370/400 |
| 2015/0109531 | A1* | 4/2015 | Nishio | G06F 5/06 |
| | | | | 348/537 |
| 2015/0304066 | A1* | 10/2015 | Dutti | H04L 43/0864 |
| | | | | 398/98 |

FOREIGN PATENT DOCUMENTS

| | | |
|---|---|---|
| CN | 102740511 A | 10/2012 |
| KR | 100763993 B1 | 10/2007 |

OTHER PUBLICATIONS

International Search Report and Written Opinion dated Aug. 29, 2014 in PCT Patent Application No. PCT/CN2014/078177.

\* cited by examiner

DATA TRANSMISSION METHOD AND SYSTEM

CROSS-REFERENCE TO RELATED APPLICATION(S)

This application is the U.S. National Phase application of PCT application number PCT/CN2014/078177 having a PCT filing date of May 22, 2014, which claims priority of Chinese patent application 201310474399.2 filed on Oct. 11, 2013, the disclosures of which are hereby incorporated by reference.

TECHNICAL FIELD

The present document relates to the field of communication, and in particular, to a data transmission method and system for a software defined radio system.

BACKGROUND OF RELATED ART

With the development of the wireless communication technology, multiple modes of communication systems appear; in order to solve and to be able to achieve multiple communication mechanisms on a single hardware platform, the Software Defined Radio (SDR) technology emerges at the right moment. The basic idea of the software defined radio is to rely on a common, standard and modular hardware platform, complete various of communication functions through the software, enable the broadband and A/D and D/A converters to be as close to the antenna as possible, so as to develop a new generation of wireless communication system with a high flexibility and openness. The SDR achieves the multiple communication mechanisms through the software under the precondition of sharing the hardware resources, effectively reduces the cost of chips, and it avoids the hardware development cost of the newly-added functions and reduces the development period through the software updating method. Therefore, the software defined radio has the characteristics of low development cost, short development period, low risk and high flexibility in the aspect of solving the multi-mode communication.

The communication interface for connecting a multi-standard digital front-end module and a baseband processor is an important component of the SDR to realize the multi-standard communication. The common practice is to use an axi master to write the downlink data of the antenna to a storage of the processor or to read the uplink data from the storage and send them to the antenna interface.

SUMMARY OF THE INVENTION

The present document provides a data transmission method and system, which solves the problem of the data transmission of the software defined radio system.

A data transmission method is provided, herein a communication interface for connecting a multi-standard digital front-end module and a baseband processor is added into a software defined radio (SDR) system, and the communication interface comprises a data path and an event table; the method comprises:

the data path mapping data received from a radio frequency controller (RFC) to a preset unified time reference, then collecting data and caching the data obtained from collection; and after the data path caches the data obtained from the collection, the event table generating a downlink data processing event, and scheduling a vector processor to perform downlink data processing.

Preferably, before the step of the data path mapping data received from an RFC to a unified time reference, then collecting data and caching the data obtained from collection, the method further comprises:

the data path generating a Major Tick of the data path when a time reference sent from a time process unit (TPU) side is same with a time reference configured by the data path;

the data path updating data path software configuration data in an interface storage space into an internal storage space when the data path is in the Major Tick of the data path, herein, the data path software configuration data comprise a time reference value of the Major Tick of the data, a starting point and an ending point of data reception and a sampling interval.

Preferably, a data path mapping data received from an RFC to a preset unified time reference, then collecting data and caching the data obtained from collection comprises:

the data path collecting the data between the starting point and the ending point of the data reception according to a requirement of the sampling interval; and caching collected data to an internal cache of the data path.

Preferably, before the step of the data path generating a Major Tick of the data path when a time reference sent from a time process unit (TPU) side is same with a time reference configured by the data path, the method further comprises:

writing data path software configuration data containing a next region configuration parameter and event table software configuration data into the interface storage space.

Preferably, before the step of an event table generating a downlink data processing event, and scheduling a vector processor to perform downlink data processing after the data path caches the data obtained from the collection, the method further comprises:

the event table generating a Major Tick of the event table when the time reference sent from the TPU side is same with the time reference configured by the event table; and the event table updating event table software configuration data in an interface storage space into an internal storage space when the event table is in the Major Tick of the event table, herein, the event table software configuration data comprise the Major Tick of the event table and a time interval for generating every Minor Tick.

Preferably, an event table generating a downlink data processing event, and scheduling a vector processor to perform downlink data processing after the data path caches the data obtained from the collection comprises:

the event table generating the Minor Tick in the Major Tick of the event table according to a requirement of the time interval for generating every Minor Tick; and the event table sending the Major Tick and the Minor Tick of the event table to the vector processor, and indicating the vector processor to perform a physical layer function process on the Major Tick of the event table and the Minor Tick.

Preferably, in a direction of the downlink data, the Major Tick of the data path is generated before the Major Tick of the event table.

Preferably, the method further comprises:

the event table controlling the vector processor to transmit uplink data to an internal cache; and the data path sending the uplink data stored in the internal cache to the RFC according to a preset unified clock.

Preferably, the event table reading the uplink data of the vector processor to the internal cache comprises:

the event table generating the Major Tick and the Minor Tick, and notifying the vector processor to prepare the uplink data; and the vector processor transmitting the uplink data to the internal cache.

Preferably, the data path sending the uplink data stored in the internal storage space to the RFC according to a preset unified clock comprises:

the data path generating the Major Tick and sending the uplink data stored in the internal cache to the RFC according to a preset unified clock.

Preferably, in a direction of the uplink data, the Major Tick of the event table is generated before the Major Tick of the data path.

The present document further provides a data transmission system, comprising:

a data path, configured to: map data received from a radio frequency controller (RFC) to a preset unified time reference, then collect data and cache the data obtained from collection; and an event table, configured to: generate a downlink data processing event, and schedule a vector processor to perform downlink data processing after the data path caches the data obtained from the collection.

Preferably, the system further comprises an interface storage space and an internal storage space; herein, the data path is further configured to: generate a Major Tick of the data path when a time reference sent from a time process unit (TPU) side is same with a time reference configured by the data path, and update data path software configuration data in the interface storage space into the internal storage space in the Major Tick of the data path, herein, the data path software configuration data comprise a time reference value of the Major Tick of the data, a starting point and an ending point of data reception and a sampling interval.

Preferably, the system further comprises:

a configuration module, configured to: write data path software configuration data containing a next region configuration parameter and event table software configuration data into the interface storage space.

Preferably, the event table is further configured to: generate a Major Tick of the event table when the time reference sent from the TPU side is same with the time reference configured by the event table; and update event table software configuration data in the interface storage space into the internal storage space in the Major Tick of the event table, herein, the event table software configuration data comprise the Major Tick of the event table and a time interval for generating every Minor Tick.

Preferably, the event table is further configured to: control the vector processor to transmit uplink data to the internal cache; and the data path is further configured to: send the uplink data stored in the internal cache to the RFC according to a preset unified clock.

The embodiment of the present document provides a data transmission method and system, herein, a communication interface for connecting a multi-standard digital front-end module and a baseband processor is added into a software defined radio (SDR) system, and the communication interface comprises a data path and an event table. In the downlink direction, a data path maps data received from a radio frequency controller (RFC) to a preset unified time reference, then collects and caches the data obtained from collection; and an event table generates a downlink data processing event, and schedules a vector processor to perform downlink data processing after the data path caches the data obtained from the collection. In the uplink direction, the event table controls the vector processor to transmit uplink data to the internal storage space; and the data path sends the uplink data stored in the internal storage space to the RFC according to a preset unified clock. Through the unified time reference and the unified clock, it avoids the problems of the hardware resource consumption and the system instability caused by switching among different times and different time references of different standards, achieves the data transmission with a high utilization rate, and solves the problem of the data transmission of the software defined radio system.

PREFERRED EMBODIMENTS

Figure 1:
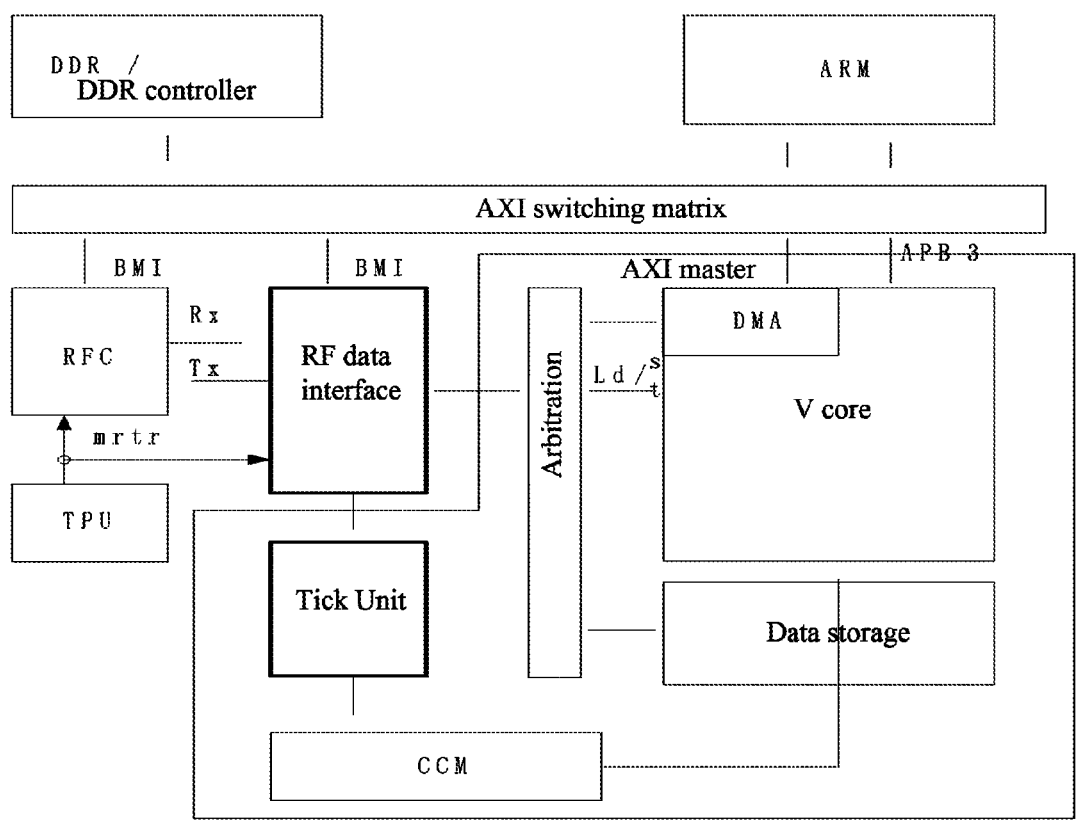
FIG. 1 is a principle block diagram of a data transmission system provided by embodiment one of the present document.

The communication interface for connecting a multi-standard digital front-end module and a baseband processor is an important component of the SDR to realize the multi-standard communication. The common practice is to use an axi master to write the downlink data of the antenna to a storage of the processor or to read the uplink data from the storage and send them to the antenna interface.

For different communication standards, the used clocks are also different. When the data of the internal storage space of the multi-standard digital front-end module and the vector processor are exchanged due to the different clocks and different time references, it is required to switch according to the difference of the standards, which brings the hardware resource consumption and the system working instability.

In order to solve the above problem, the embodiment of the present document provides a data transmission method and system. The embodiments of the present document are described in detail with reference to the accompanying drawings hereinafter. It should be illustrated that, in the case of not conflicting, the embodiments in the present application and features in these embodiments can be combined with each other.

The realization of the software defined radio mainly has two modes, the vector processor and the multi-core DSP. The embodiment of the present document is illustrated by taking the vector processor as an example, but the application object of the technical scheme provided by the embodiment of the present document is not limited to the vector processor.

The embodiment one of the present document is described with reference to the accompanying drawings firstly.

The embodiment of the present document provides a data transmission method. The communication interface for connecting a multi-standard digital front-end module and a baseband processor is added into a software defined radio (SDR) system, and the communication interface comprises a data path and an event table. The communication interface used by the embodiment of the present document is based on the same unified clock and the same unified time reference, which is the communication interface used for connecting the multi-standard digital front-end module and the baseband processor. The data path completes the high-speed interconnection of the IQ data in the RFC and the internal storage space of the baseband processor. The event table part is responsible for generating the event to schedule the operation of the vector processor. The upper layer arm (mainly responsible for the communication protocol software and the physical layer control) completes the corresponding configuration of the event table according to different communication modes, and enables it to complete generating the event on the same hardware resources, and start the vector processor to complete the data processing.

The embodiment of the present document realizes a communication interface based on the same clock and same time reference, which is used for connecting the multi-standard digital front-end module and the baseband processor. The interface is divided into two parts: the data path and the event table, and the two are controlled independently. The data path part completes the high-speed interconnection of the IQ data in the RFC and the internal storage space of the baseband processor. The event table is responsible for generating the event to schedule the vector processor to complete the physical layer processing. The data path and the event table are to be used cooperatively, that is, there is a certain time interval between the beginnings of the working of the two, so that the vector processor is able to complete the data processing of the physical layer timely. The clock frequencies in different communication modes are not the same, for example, it is 30.72 Mhz under the LTE, it is 15.36 Mhz under the WCDMA, and it is 5.12 Mhz under the TD SCDMA; there are respective time references (the counters in respective mode and frequency, with a certain frame format) in different modes. In the embodiment of the present document, the unified clock 30.72 Mhz and the unified time reference (mrtr, which can be regarded as a free counter with the 30.72 mhz clock, and the counting range is 0~307199) are adopted. When the software configuration is performed on the communication interface, the time reference of each communication standard is mapped to the unified time reference mrtr. For the data path part, the software configures the registers of the communication interface, including the registers, such as, the mrtr value of the Major Tick of the data, the starting point and the ending point of the data reception (relative to the position of the Major Tick) and the sampling interval, etc. The Major Tick of the data path is generated when the mrtr sent from a time process unit (TPU) side is same with a configured value, and the data path updates a software configuration value into the internal register, and collects or sends the data between the starting point and the ending point of the data according to the requirement of the sampling interval. For the event table part, the software configures the registers of the communication interface, including the registers, such as, the mrtr value at the Major Tick of the event table, the time interval for generating every Minor Tick after the Major Tick, etc. The Major Tick of the event table is generated when the mrtr sent from the TPU side is same with the configured value, and the Minor Tick is generated according to the requirement of the configured time interval.

The embodiment of the present document provides a data transmission system and its structure is shown in FIG. 1, including an arm processor, an AXI matrix (AXI switching matrix), a vector processor (the part in the dashed box), the communication interface of the embodiment of the present document and an RFC. The Arm processor can configure the communication interfaces and the RFC of the embodiment of the present document through the AXI bus, and the configured interfaces are the BMI and APB3. In addition, the vector processors has an AXI master interface which can directly read and write the periphery memory, such as, the DDR, etc.; the DMA in the vector processor can transfer the data between the peripheral memory and the vector internal storage space through that interface.

The upper layer arm is mainly responsible for the communication protocol software and the physical layer control, and the multi-standard digital front-end module (RFC) is responsible for the pre-processing of the IQ signal received and transmitted by the radio frequency. The baseband processor is responsible for the physical layer processing of the IQ data. The communication interface of the embodiment of the present document includes two parts: the data path part and the event table. The data path completes the high-speed interconnection of the IQ data in the RFC and the internal storage space of the baseband processor. The event table is responsible for generating the tick and sending to the vector processor at the configured time point, to schedule the vector processor to complete the physical layer processing.

Figure 2:
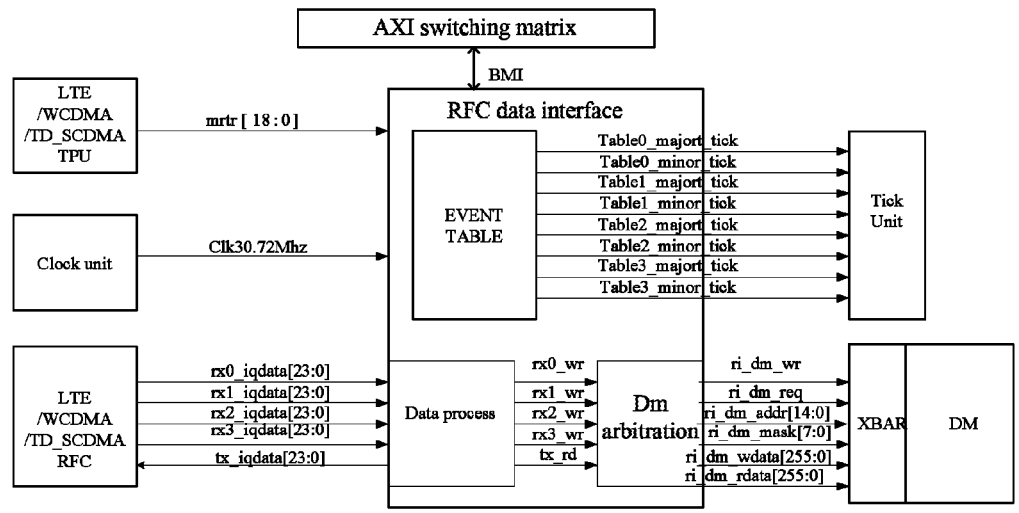
FIG. 2 a detailed block diagram of a communication interface in embodiment one of the present document.

FIG. 2 a detailed block diagram of a communication interface provided by an embodiment of the present document.

The embodiment of the present document can be applied to the communication mode of LTE, TD_SCDMA and WCDMA, and other modes can be designed with the same principle. The data path part of the communication interface of the embodiment of the present document is explained hereinafter. In the downlink path: the IQ data is written from the RFC into the internal cache of the interface of the embodiment of the present document. Here, the same clock of which the frequency is 30.72 Mhz, and the same time reference (mrtr, which can be regarded as a counter with the 30.72 mhz clock, and the counting range is 0~307199) are adopted; and the data sampling frequencies will be different according to the different communication modes or different bandwidths under a same communication mode, for example, in the LTE mode and under 20 m bandwidth, one data are received for every 30.72 Mzh; and under 1.4 m bandwidth, one data are received for every sixteen 30.72 M clocks; in the WCDMA mode, one data are received for every two 30.72 Mzh, and in the TD SCDMA mode, one data are received for every six 30.72 Mzh. The software configures the interface storage space of the communication interface (which can include a plurality of registers), including the mrtr value of the Major Tick of the data (the software is responsible for mapping the time references under different communication modes to the same mrtr and then configuring the register), the starting point and the ending point of the data reception (relative to the position of the Major Tick) and the sampling interval. Preferably, each parameter value has a corresponding register in the interface storage space. The Major Tick of the data path is generated when the mrtr sent from a time process unit (TPU) side is same with a configured value, and the data path updates a software configuration value into the internal register, and collects the data between the starting point and the ending point of the data according to the requirement of the sampling interval. The data will be written into the internal storage space of the vector processor after cached. The clock here is a high frequency working clock of the vector processor.

In the direction of the uplink path: the communication interface provided by the embodiments of the present document reads the data from the internal memory of the vector processing to the internal cache of the communication interface; the clock here is the high frequency working clock of the vector; then it is sent to the RFC as per the clock frequency of the low frequency (such as 30.72Mhz). The control mechanism of its uplink path is same with that of the downlink path. It is noted that the priority level that the embodiment of the present document accesses the vector processor is the highest, to ensure that the data are received and sent in a timely and effective manner. Herein, there are multiple downlink data paths, which can be configured for using according to the requirement; for example, under the LTE, it can be configured as rx and csr.

The event table part of the communication interface of the embodiment of the present document is explained. The software configures the registers of the communication interface, including, the registers, such as, the mrtr value of the Major Tick of the event table (the software is responsible for mapping the time references under different communication modes to the same mrtr and then configuring the register), the time interval for generating every Minor Tick after the Major Tick. The Major Tick of the event table is generated when the mrtr sent from the TPU side is same with the configured value, and the Minor Tick is generated according to the requirement of the configured time interval. The Major Tick and the Minor Tick will be sent to the TU of the vector processor, and the TU will store the tick by using the FIFO, and the vector processor will take the tick from the TU, in order to perform the physical layer function processing of the communication. On the hardware, there are multiple event tables, and the software can be free to arrange the use of each event table.

Figure 3:
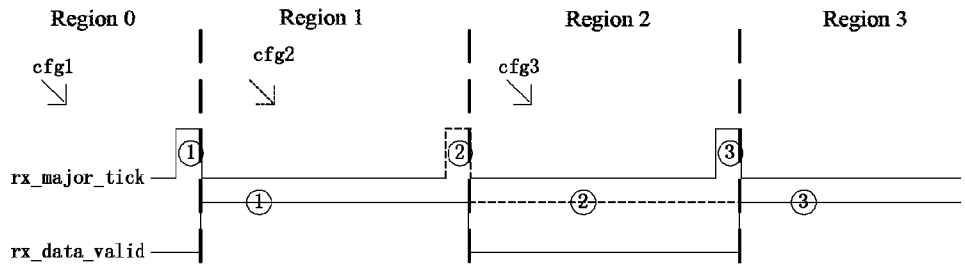
FIG. 3. is a detailed block diagram of a register updating mechanism of a communication interface in embodiment one of the present document.

FIG. 3. is a detailed block diagram of a storage space updating mechanism of a communication interface used in an embodiment of the present document. The communication interface has two storage spaces, which are the interface storage space and the internal storage space, and especially they are two sets of registers with same functions. One set of register is a register which can be accessed by arm, called the interface register, and used for the software configuration. Another set of register is the internal used register, for controlling the working mode of the interface of the current embodiment of the present document. The communication interface of the embodiment of the present document will update the interface register to the internal register by regarding the Major Tick as the demarcation point (the Major Tick of the data path is different with the Major Tick of the event table). The specific configuration principle is as follows.

1, the control signal of one Region is configured and generated every time, and the Major Tick is used as the dividing line of the Regions.

2, the parameters configured in the current Region are valid in the next Region, that is, the current Region configures the parameters of the next Region.

The specific process is shown in FIG. 3:

1, the Region0 configures the parameter of the region 1, as the cfg1 in the figure, which will generate the control signal as shown by the solid line ①;

2, if the Region1 configures the parameters of the region 2, as the cfg2 in the figure, which will generate the control signal as shown by the dotted line ②.Otherwise, the control signal of the dashed line ② will not be generated.

The Region can be defined differently according to the applications. The configuration process is illustrated by taking the LTE as an example. The Region can be a subframe, the data can be received by the subframe as a unit, and the current subframe can configure the parameters of the next frame. If the parameters of a subframe are configured, then the data of a subframe are received according to the requirement of the parameters.

Figure 4:
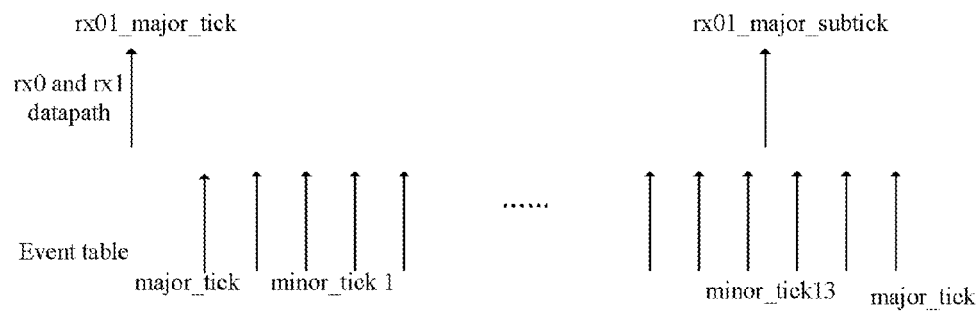
FIG. 4 is a relationship block diagram of a downlink data path and a downlink event table of a communication interface in embodiment one of the present document.

FIG. 4 is a relationship block diagram of a downlink data path and a downlink event table of a communication interface in embodiment one of the present document. The role of the downlink event table is: to generate the Major Tick and the Minor Tick, and notify the vector processor to perform the downlink data processing. The relationship between the downlink data path and the downlink event table needs to guarantee: first starting the downlink data path, and then starting the event table after receiving some certain data, and notifying the vector processor to perform the downlink data processing. Because the data path and the event table: are respectively controlled independently, and because both are regarding their own Major Ticks as the starting points, the configuration requirement is to first generate the Major Tick of the data path, and then generate the Major Tick of the downlink event table according to the application requirement after a period of time.

Figure 5:
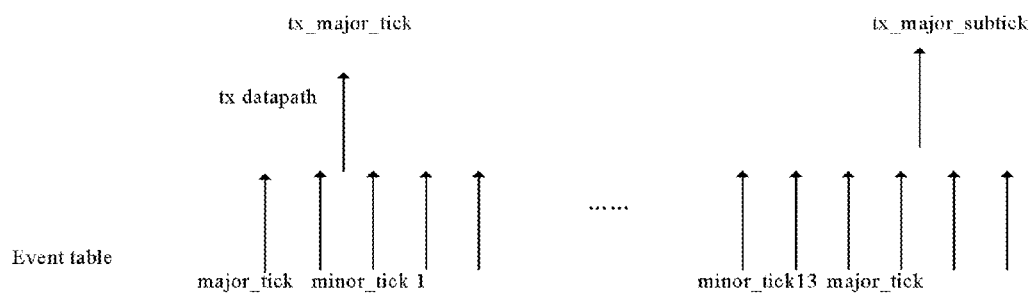
FIG. 5 is a relationship block diagram of an uplink data path and an uplink event table of a communication interface in embodiment one of the present document.

FIG. 5 is a relationship block diagram of an uplink data path and an uplink event table of a communication interface in embodiment one of the present document. The role of the event table is: to generate the Major Tick and the Minor Tick, and notify the vector processor to prepare the uplink data. The relationship between the data path and the event table needs to guarantee: first starting the event table, notifying the vector processor to prepare some certain data, and then starting the data path to send the data. Because the data path and the event table: are respectively controlled independently, and because both are regarding their own Major Ticks as the starting points, the configuration requirement is to first generate the Major Tick of the event table, and then generate the Major Tick of the data path according to the application requirement after a period of time.

The embodiment two of the present document is described with reference to the accompanying drawings hereinafter.

Figure 6:
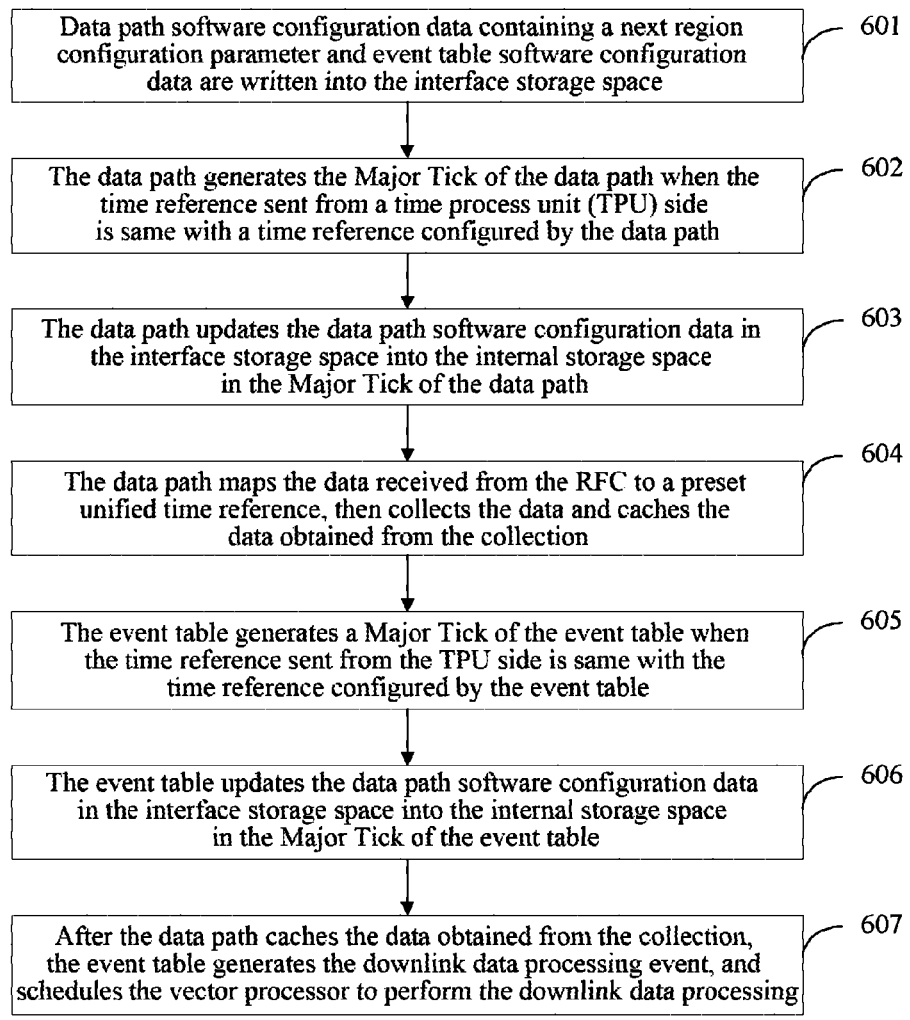
FIG. 6 is a flow chart for a data transmission method provided by embodiment two of the present document.

The embodiment of the present document provides a data transmission method, and the procedures of using the method to complete performing the downlink transmission on the data with different standards by the software defined radio system are as shown in FIG. 6:

in step 601, data path software configuration data containing a next region configuration parameter and event table software configuration data are written into the interface storage space;

in this step, specifically the data path software configuration data and the event table software configuration data can be configured by the ARM or the vector processor.

The data path software configuration data include a time reference value of the Major Tick of the data, a starting point and an ending point of the data reception and a sampling interval.

The event table software configuration data include the Major Tick of the event table and a time interval of generating every Minor Tick.

In step 602, the data path generates the Major Tick of the data path when the time reference sent from a time process unit (TPU) side is same with a time reference configured by the data path.

In step 603, the data path updates the data path software configuration data in the interface storage space into the internal storage space in the Major Tick of the data path.

In step 604, the data path maps the data received from the RFC to a preset unified time reference, then collects the data and caches the data obtained from the collection.

The step specifically includes the following steps:

1, the data path collects the data between the starting point and the ending point of the data receiving according to a requirement of the sampling interval; and 2, the collected data are cached to the internal cache of the data path.

In step 605, the event table generates a Major Tick of the event table when the time reference sent from the TPU side is same with the time reference configured by the event table.

In step 606, the event table updates the event table software configuration data in the interface storage space into the internal storage space in the Major Tick of the event table.

In step 607, after the data path caches the data obtained from the collection, the event table generates the downlink data processing event, and schedules the vector processor to perform the downlink data processing.

The step specifically includes the following steps:

1, the event table generates the Minor Tick in the Major Tick of the event table according to a requirement of the time interval for generating every Minor Tick; and 2, the event table sends the Major Tick and the Minor Tick of the event table to the vector processor, and indicates the vector processor to perform a physical layer function process on the Major Tick of the event table and the Minor Tick.

It needs to be explained that, in a direction of the downlink data, the Major Tick of the data path is generated before the Major Tick of the event table.

The following is the procedures of completing the data transmission in the uplink direction by using the data transmission method provided by the embodiment of the present document.

Firstly, the event table controls the vector processor to transmit the uplink data to the internal cache. Specifically, the event table generates the Major Tick and the Minor Tick, and notifies the vector processor to prepare the uplink data; and then the vector processor transmits the uplink data to the internal cache.

And then, the data path sends the uplink data stored in the internal cache to the RFC according to a preset unified clock. Specifically, the data path generates the Major Tick and sends the uplink data stored in the internal cache to the RFC according to the preset unified clock.

It needs to be explained that, in a direction of the uplink data, the Major Tick of the event table is generated before the Major Tick of the data path.

The embodiment three of the present document is described with reference to the accompanying drawings hereinafter.

Figure 7:
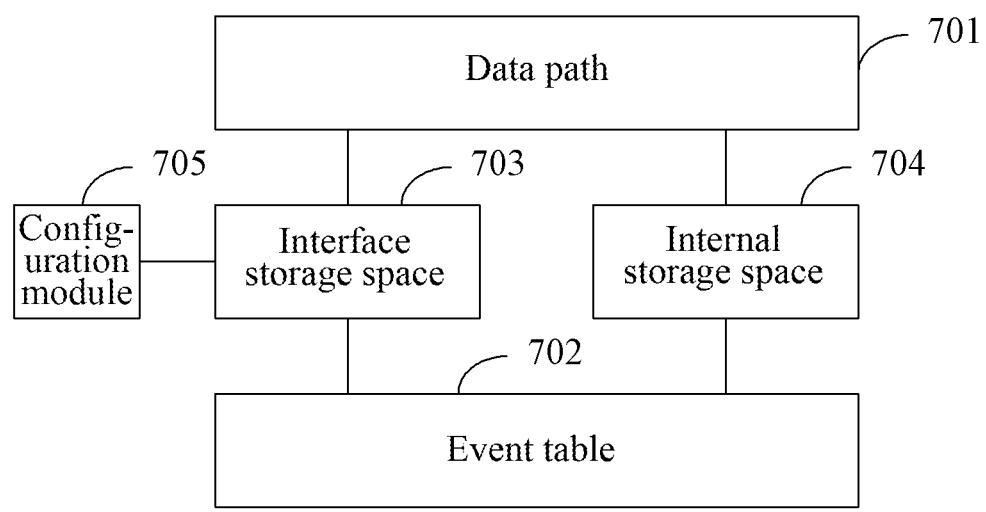
FIG. 7 is a structure diagram of a data transmission system provided by embodiment three of the present document.

The embodiment of the invention provides a data transmission system, the structure of which is shown in FIG. 7, including:

a data path 701, used for mapping data received from an RFC to a preset unified time reference, then collecting data and caching the data obtained from collection;

an event table, used for, after the data path caches the data obtained from the collection, generating a downlink data processing event, and scheduling a vector processor to perform downlink data processing.

Preferably, the system further includes an interface storage space 703 and an internal storage space 704;

the data path 701 is further used for generating a Major Tick of the data path 701 when a time reference sent from a time process unit (TPU) side is same with a time reference configured by the data path 701, and updating data path software configuration data in the interface storage space 703 into the internal storage space 704 in the Major Tick of the data path 701, herein, the data path software configuration data comprise a time reference value of the Major Tick of the data, a starting point and an ending point of data reception and a sampling interval.

Preferably, the system further comprises:

a configuration module 705, used for writing data path software configuration data containing a next region configuration parameter and event table software configuration data into the interface storage space 703. The configuration module can be integrated in the ARM or the vector processor.

Preferably, the event table 702 is further used for generating a Major Tick of the event table 702 when the time reference sent from the TPU side is same with the time reference configured by the event table 702; and updating event table software configuration data in the interface storage space 703 into the internal storage space 704 in the Major Tick of the event table 702, herein, the event table software configuration data comprise the Major Tick of the event table and a time interval for generating every Minor Tick.

Preferably, the event table 702 is further used for controlling the vector processor to transmit uplink data to the internal cache; and the data path 701 is further used for sending the uplink data stored in the internal cache to the RFC according to a preset unified clock.

The data transmission system provided by the embodiment of the present document can be integrated into the communication interface of the embodiment one of the present document.

The embodiment of the present document provides a data transmission method and system, herein, a communication interface for connecting a multi-standard digital front-end module and a baseband processor is added into a software defined radio (SDR) system, and the communication interface comprises a data path and an event table. In the downlink direction, a data path maps data received from a radio frequency controller (RFC) to a preset unified time reference, then collects data and caches the data obtained from collection; and an event table generates a downlink data processing event, and schedules a vector processor to perform downlink data processing after the data path caches the data obtained from the collection. In the uplink direction, the event table controls the vector processor to transmit uplink data to the internal storage space; and the data path sends the uplink data stored in the internal storage space to the RFC according to a preset unified clock. Through the unified time reference and the unified clock, it avoids the problems of the hardware resource consumption and the system instability caused by switching among different times and different time references of different standards, achieves the data transmission with a high utilization rate, and solves the problem of the data transmission of the software defined radio system.

Under different communication modes, based on a unified clock and a unified time reference mrtr, the data interaction between the multi-standard digital front-end module and the internal storage space of the vector processor is achieved, and the hardware resource consumption and the working instability caused by switching among different clocks of different standards and among different time references are avoided.

Under different communication modes, the data path hardware resources are shared, and its registers are configured through the software, to achieve the control of the data reception and transmission, which reduces the hardware resources and increase the flexibility of design.

Under different communication modes, the event table hardware resources are shared, different events are generated through the arm configuring the event table to start the vector processor to complete the data processing.

It can be understood by those skilled in the art that all or part of steps in the above-mentioned embodiment can be fulfilled by the computer program flow, and the computer program flow can be stored in a computer readable storage medium, and the computer program flow is executed on the corresponding hardware platform (such as a system, a device, an apparatus, a component, etc.), and includes one of the steps of the method embodiment or its combination when being executed.

Alternatively, all or part of the steps in the above-mentioned embodiments also can be implemented by the integrated circuits. Those steps can be made into integrated circuit modules one after another respectively, or multiple modules or steps therein are made into a single integrated circuit module for implementation. In this way, the present document is not limited to any specific combination of the hardware and software.

Each apparatus/function module/function unit in the above-mentioned embodiment can be implemented by the universal calculating apparatus, and they can be integrated in a single calculating apparatus, or distributed in the network made up of a plurality of calculating apparatus.

Each apparatus/function module/function unit in the above-mentioned embodiment can be stored in a computer readable storage medium when it is implemented in the form of the software function module and is sold or used as an individual product. The above-mentioned computer readable storage medium can be a read only memory, a magnetic disk or an optical disk, etc.

Those modifications and replacements which can be thought out easily by those skilled in the art in the technical scope disclosed by the present document should be embodied in the protection scope of the present document. Therefore, the protection scope of the present document should be subject to the protection scope described by the claims.

INDUSTRIAL APPLICABILITY

The data path and the event table related in the embodiment of the present document are independently controlled and worked; through the software configuration, the working of the two is enabled to meet a certain requirement of time interval, so that the vector processor is able to complete the data processing timely.

The technical scheme provided by the embodiment of the present document can realize the efficient interaction between the multi-standard digital front-end module and the vector processor on the same hardware module. Compared with the traditional software defined radio system, it greatly saves the area and the power consumption, which has a strong commonality, scalability and flexibility.

What is claimed is:

1. A data transmission method, comprising: adding a communication interface for connecting a multi-standard digital front-end module and a baseband processor into a software defined radio (SDR) system, wherein the communication interface comprises a data path and an event table; the method comprising:

the data path mapping data received from a radio frequency controller (RFC) to a preset unified time reference, then collecting data and caching the data obtained from collection; and after the data path caches the data obtained from collection, the event table generating a downlink data processing event, and scheduling a vector processor to perform downlink data processing;

before the step of the data path mapping data received from an RFC to a unified time reference, then collecting data and caching the data obtained from collection, further comprising:

the data path generating a Major Tick of the data path when a time reference sent from a time process unit (TPU) side is same with a time reference configured by the data path;

the data path updating data path software configuration data in an interface storage space into an internal storage space at the Major Tick of the data path, wherein the data path software configuration data comprise a time reference value of the Major Tick of data, a starting point and an ending point of data reception and a sampling interval.

2. The data transmission method according to claim 1, wherein the data path mapping data received from an RFC to a preset unified time reference, then collecting data and caching the data obtained from collection comprises:

the data path collecting data between the starting point and ending point of the data reception according to a requirement of the sampling interval; and caching collected data to an internal cache of the data path.

3. The data transmission method according to claim 1, before the step of the data path generating a Major Tick of the data path when a time reference sent from a time process unit (TPU) side is same with a time reference configured by the data path, further comprising:

writing data path software configuration data containing a next region configuration parameter and event table software configuration data into the interface storage space.

4. The data transmission method according to claim 3, before the step of the event table generating a downlink data processing event, and scheduling a vector processor to perform downlink data processing after the data path caches the data obtained from collection, further comprising:

the event table generating a Major Tick of the event table when the time reference sent from the TPU side is same with the time reference configured by the event table; and the event table updating event table software configuration data in an interface storage space into an internal storage space in the Major Tick of the event table, wherein the event table software configuration data comprise the Major Tick of the event table and a time interval for generating every Minor Tick.

5. The data transmission method according to claim 4, wherein the event table generating a downlink data processing event and scheduling a vector processor to perform downlink data processing after the data path caches the data obtained from collection comprises:
  the event table generating a Minor Tick in the Major Tick of the event table according to a requirement of the time interval for generating every Minor Tick; and
  the event table sending the Major Tick of the event table and the Minor Tick to the vector processor, and indicating the vector processor to perform a physical layer function process on the Major Tick of the event table and the Minor Tick.

6. The data transmission method according to claim 5, wherein in a direction of downlink data, the Major Tick of the data path is generated before the Major Tick of the event table.

7. The data transmission method according to claim 5, further comprising:
  the event table controlling the vector processor to transmit uplink data to the internal cache; and
  the data path sending the uplink data stored in the internal cache to the RFC according to a preset unified clock.

8. The data transmission method according to claim 7, wherein the event table reading the uplink data of the vector processor to the internal cache comprises:
  the event table generating the Major Tick and the Minor Tick, and notifying a vector processor to prepare uplink data; and
  the vector processor transmitting the uplink data to the internal cache.

9. The data transmission method according to claim 8, wherein the data path sending the uplink data stored in the internal storage space to the RFC according to a preset unified clock comprises:
  the data path generating the Major Tick and sending the uplink data stored in the internal cache to the RFC according to a preset unified clock.

10. The data transmission method according to claim 8, wherein, in a direction of uplink data, the Major Tick of the event table is generated before the Major Tick of the data path.

11. A data transmission system, comprising:
  a data path, configured to: map data received from a radio frequency controller (RFC) to a preset unified time reference, then collect data and cache the data obtained from collection; and
  an event table, configured to: generate a downlink data processing event, and schedule a vector processor to perform downlink data processing after the data path caches the data obtained from collection;
  an interface storage space and an internal storage space; wherein,
  the data path is further configured to: generate a Major Tick of the data path when a time reference sent from a time process unit (TPU) side is same with a time reference configured by the data path, and update data path software configuration data in the interface storage space into the internal storage space at the Major Tick of the data path, wherein the data path software configuration data comprise a time reference value of the Major Tick of data, a starting point and an ending point of data reception and a sampling interval.

12. The data transmission system according to claim 11, further comprising:
  a configuration module, configured to: write data path software configuration data containing a next region configuration parameter and event table software configuration data into the interface storage space.

13. The data transmission system according to claim 12, wherein,
  the event table is further configured to: generate a Major Tick of the event table when the time reference sent from the TPU side is same with the time reference configured by the event table; and update event table software configuration data in the interface storage space into the internal storage space in the Major Tick of the event table, wherein the event table software configuration data comprise the Major Tick of the event table and a time interval for generating every Minor Tick.

14. The data transmission system according to claim 13, wherein,
  the event table is further configured to: control the vector processor to transmit uplink data to the internal cache; and
  the data path is further configured to: send the uplink data stored in the internal cache to the RFC according to a preset unified clock.

* * * * *